(12) United States Patent
Walton (10) Patent No.: US 9,247,052 B1
(45) Date of Patent: Jan. 26, 2016

(54) APPARATUSES AND METHODS FOR ROUTING DIGITAL VOICE DATA IN A COMMUNICATION SYSTEM FOR HEARING-IMPAIRED USERS

(71) Applicant: CaptionCall, LLC, Salt Lake City, UT (US)

(72) Inventor: Sean Walton, Orem, UT (US)

(73) Assignee: CAPTIONCALL, LLC, Salt Lake City, UT (US)

( * ) Notice: Subject to any disclaimer, the term of this patent is extended or adjusted under 35 U.S.C. 154(b) by 0 days.

(21) Appl. No.: 14/709,303

(22) Filed: May 11, 2015

Related U.S. Application Data (60) Provisional application No. 62/079,872, filed on Nov. 14, 2014.

(51) Int. Cl.
| | | |
|---|---|---|
| *H04M 11/00* | (2006.01) | |
| *H04M 3/42* | (2006.01) | |
| *H04W 4/16* | (2009.01) | |
| *H04M 7/00* | (2006.01) | |

(52) U.S. Cl.
CPC ........ *H04M 3/42391* (2013.01); *H04M 7/0093* (2013.01); *H04W 4/16* (2013.01)

(58) Field of Classification Search
None
See application file for complete search history.

(56) References Cited

U.S. PATENT DOCUMENTS

| | | | |
|---|---|---|---|
| 5,909,482 A | 6/1999 | Engelke | |
| 5,974,116 A | 10/1999 | Engelke et al. | |
| 5,978,654 A | 11/1999 | Colwell et al. | |
| 6,075,841 A | 6/2000 | Engelke et al. | |
| 6,075,842 A | 6/2000 | Engelke et al. | |
| 6,112,103 A * | 8/2000 | Puthuff ................. | H04M 1/247 455/550.1 |
| 6,233,314 B1 | 5/2001 | Engelke | |
| 6,307,921 B1 | 10/2001 | Engelke et al. | |
| 6,493,426 B2 | 12/2002 | Engelke et al. | |
| 6,504,910 B1 | 1/2003 | Engelke et al. | |
| 6,510,206 B2 | 1/2003 | Engelke et al. | |
| 6,549,611 B2 | 4/2003 | Engelke et al. | |
| 6,567,503 B2 | 5/2003 | Engelke et al. | |
| 6,594,346 B2 | 7/2003 | Engelke | |
| 6,603,835 B2 | 8/2003 | Engelke et al. | |
| 6,748,053 B2 | 6/2004 | Engelke et al. | |
| 6,882,707 B2 | 4/2005 | Engelke et al. | |
| 6,885,731 B2 | 4/2005 | Engelke et al. | |
| 6,934,366 B2 | 8/2005 | Engelke et al. | |

(Continued)

*Primary Examiner* — Maria El-Zoobi
(74) *Attorney, Agent, or Firm* — TraskBritt (57) ABSTRACT

A communication system facilitating communication for assisting hearing-impaired users includes an analog telephone adaptor (ATA) device and a communication device. The communication device is configured to route digital voice data between the ATA device and a second communication device during a conversation involving the communication device and a second communication device through a wireless port of communication device, and communicate through the wireless port with a relay service configured to provide interpretive assistance for a hearing-impaired user of the communication device. A method includes routing digital voice data received wirelessly by a communication device to an ATA device, routing digital voice data received from the ATA device from the communication device wirelessly to a second communication device, and communicating wirelessly with a relay service configured to provide captioning services of the content of a portion of the voice data received by the communication device from the second communication device.

17 Claims, 4 Drawing Sheets

(56) References Cited

U.S. PATENT DOCUMENTS

| | | |
|---|---|---|
| 7,003,082 B2 | 2/2006 | Engelke et al. |
| 7,006,604 B2 | 2/2006 | Engelke |
| 7,164,753 B2 | 1/2007 | Engelke et al. |
| 7,319,740 B2 | 1/2008 | Engelke et al. |
| 7,555,104 B2 | 6/2009 | Engelke |
| 7,660,398 B2 | 2/2010 | Engelke et al. |
| 7,881,441 B2 | 2/2011 | Engelke et al. |
| 8,213,578 B2 | 7/2012 | Engleke et al. |
| 8,379,801 B2 | 2/2013 | Romriell et al. |
| 8,416,925 B2 * | 4/2013 | Engelke ............ G10L 15/265 379/52 |
| 8,908,838 B2 | 12/2014 | Engelke et al. |
| 8,917,821 B2 | 12/2014 | Engelke et al. |
| 8,917,822 B2 | 12/2014 | Engelke et al. |
| 2004/0010323 A1 * | 1/2004 | Martin ............ H04L 41/046 700/3 |
| 2008/0101552 A1 * | 5/2008 | Khan ............ H04L 12/66 379/45 |
| 2008/0187108 A1 | 8/2008 | Engelke et al. |
| 2011/0170672 A1 | 7/2011 | Engelke et al. |
| 2012/0250837 A1 | 10/2012 | Engleke et al. |

* cited by examiner

APPARATUSES AND METHODS FOR ROUTING DIGITAL VOICE DATA IN A COMMUNICATION SYSTEM FOR HEARING-IMPAIRED USERS

CROSS-REFERENCE TO RELATED APPLICATION

This application claims the benefit of U.S. Provisional Patent Application Ser. No. 62/079,872, filed Nov. 14, 2014, the disclosure of which is hereby incorporated herein in its entirety by this reference.

FIELD

Embodiments of the disclosure relate to the routing voice data in a communication network. More particularly, the disclosure relates to routing of digital voice data between a communication device and an analog telephone adaptor in a system that facilitates communication for hearing-impaired users employing a relay service for assistance.

BACKGROUND

Communication systems provide communication between two or more users during a communication session. Such communication system may include devices that assist hearing-impaired users to have a substantially functionally-equivalent experience as a hearing user using conventional communication devices. Many such communication devices include text captioned phones, video phones, and the like, which may communicate with a relay service providing interpretive services (e.g., captioning, sign language interpreting, etc.) for the hearing-impaired user. Many of these communication devices being are only configured for performing the communication in an analog domain (e.g., the voice data may only be analog) even though other digital data (e.g., captions) may be received. Some users wanting to connect such devices to internet-based (e.g., VoIP) networks may use analog telephone adaptors to perform the conversion of the voice signals between analog and digital domains. The use of such analog telephone adaptors may limit the locations that the user may place the communication devices because of wiring and other costs associated therewith.

BRIEF SUMMARY

Described is a communication device for use with a hearing-impaired user. The communication device includes a wireless data port, a digital data port, an analog data port, and a processor operably coupled with the wireless data port, the digital data port, and the analog data port. The processor is configured to communicate through the wireless data port with a relay service for assisting hearing-impaired users to communicate with others, communicate through the wireless data port with a second communication device to transmit and receive digital voice data during a conversation, and route the digital voice data to an analog telephone adaptor (ATA) device through the digital data port.

In some embodiments, disclosed is a communication system facilitating communication for assisting hearing-impaired users. The communication system includes an analog telephone adaptor (ATA) device, and a communication device operably coupled with the ATA device. The communication device is configured to route digital voice data between the ATA device and the relay service during a conversation involving the communication device and a second communication device through a wireless port of communication device, and communicate through the wireless port with a relay service configured to provide interpretive assistance for a hearing-impaired user of the communication device.

In some embodiments, disclosed is a communication system. The communication system includes a relay service configured to provide interpretive services for hearing-impaired users, a communication device operably coupled with the relay service, and an analog telephone adaptor (ATA) device operably coupled with the communication device. The communication device is configured to provide the interpretive services from the relay service to a hearing-impaired user of the communication device. The ATA device is configured to convert digital voice data received from the communication device to analog voice data, transmit the analog voice data to the communication device, convert analog received from voice data from the communication device to digital voice data, and transmit the digital voice data to the communication device. The communication device is further configured to route the digital data between the ATA device and a second communication device.

In some embodiments, disclosed is a method of facilitating communication in a communication network including a communication device and a relay service. The method includes routing digital voice data received wirelessly by a communication device to an analog telephone adaptor (ATA) device, routing digital voice data received from the ATA device from the communication device wirelessly to a second communication device, and communicating wirelessly with a relay service configured to provide captioning services of the content of at least a portion of the voice data received by the communication device from the second communication device.

DETAILED DESCRIPTION

In the following detailed description reference is made to the accompanying drawings that form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions, rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

A processor herein may be any processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a general-purpose computer because, absent the disclosure, the general-purpose computer would not be able to carry out the processes of the disclosure. The disclosure also provides meaningful limitations in one or more particular technical environments that go beyond an abstract idea. For example, embodiments of the disclosure provide improvements in the technical field of telecommunications, communication devices connected to a relay service, and other related technical fields. In particular, embodiments of the present disclosure may improve the flow of data and provide additional options for connectivity such that the communication device itself and the communication system may be improved upon over conventional embodiments.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, interfacing with an operating system, etc. Furthermore, the methods disclosed herein may be implemented in hardware, software, or both. If implemented in software, the functions may be stored or transmitted as one or more instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, a hearing-impaired user may be a person with diminished hearing capabilities. Some hearing-impaired users may have some level of hearing and/or speaking ability, while others may not have any such ability. Hearing-impaired users may need to be certified in order to access the communication system.

Figure 1:
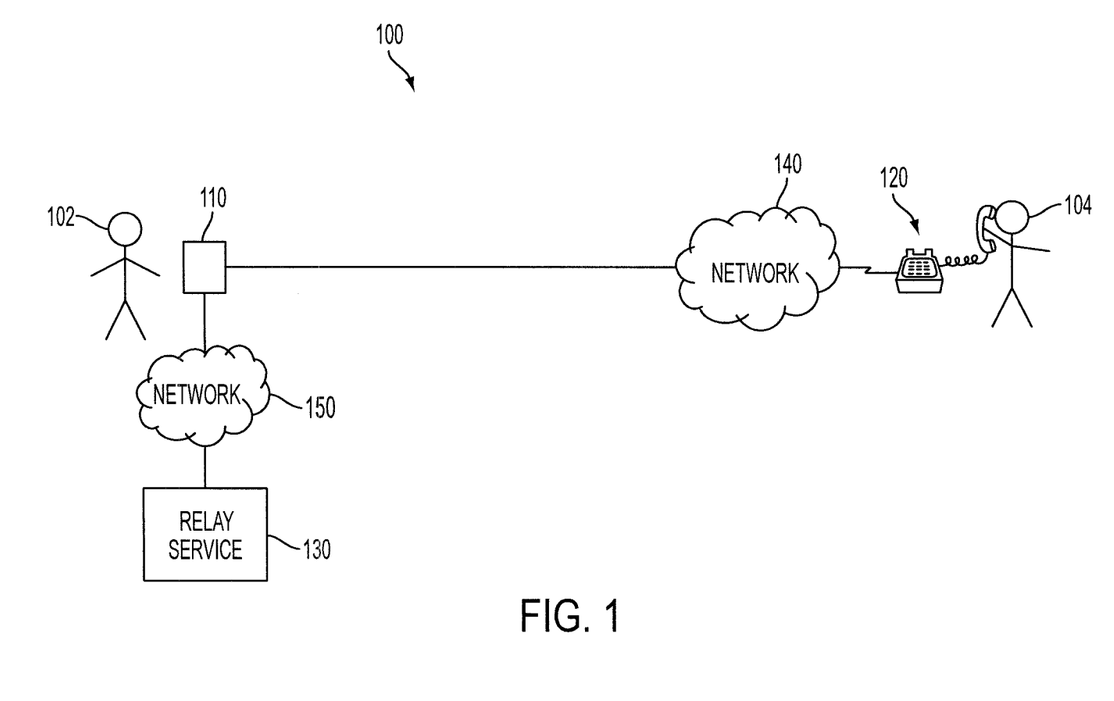
FIG. 1 illustrates a communication system configured to facilitate a communication session between a hearing-impaired user and a hearing-capable user hereof.

FIG. 1 illustrates a communication system 100 configured to facilitate a communication session between a hearing-impaired user 102 and a hearing-capable user 104 according to an embodiment of the disclosure. The communication system 100 may include a first communication device 110, a second communication device 120, and a relay service 130. The first communication device 110 and the second communication device 120 may be coupled together to facilitate communication therebetween via a first network 140. The first communication device 110 and the relay service 130 may be coupled together to facilitate communication therebetween via a second network 150. For example only, the first network 140 and the second network 150 may each be implemented according to the standards and bandwidth requirements of a communication network (e.g., Public Switch Telephone Network (PSTN), cellular network, Voice Over Internet Protocol (VOIP) networks, etc.). The use of the terms "network" or "communication network" as used herein contemplates networks that are compatible and configured to provide communications using analog and/or digital standards unless specifically stated otherwise. In some embodiments, the first network 140 and the second network 150 may be the same network (e.g., both connections may be Internet-based connections). Thus, discussion of the first network 140 and the second network 150 separately may be for convenience of discussing a particular connection between two or more devices. Of course, in some embodiments, the first network 140 and the second network 150 may be different networks. For example, the first communication device 110 and the second communication device 120 may communicate via a PSTN network connection, while the first communication device 110 and the second communication device 120 may communicate via an internet connection. Other variations and combinations of networks are also contemplated.

The first communication device 110 may include a device that is configured to assist the hearing-impaired user 102 in communicating with another individual (e.g., hearing-capable user 104 or another hearing-impaired user). In some embodiments, the first communication device 110 may include a captioned telephone, a telephone enabled for text enhanced telephony, or any other suitable communication device configured to receive and display a text caption of at least a portion of the conversation. Thus, the hearing-impaired user 102 may be able to read a caption of the words spoken by the hearing-capable user 104 to supplement the audio generated by the first communication device 110 from the voice signal received by the first communication device 110. As a result, the hearing-impaired user 102 may have an improved experience in understanding the conversation. Such an embodiment may be useful for people whose hearing has been damaged or decreased over time (e.g., the elderly); such that they can still speak but have diminished hearing that makes it difficult to communicate. In some embodiments, the first communication device 110 may include a communication device (e.g., video telephone) configured to receive and display video on an electronic display on the first communication device 110. In addition, the first communication device 110 may include a camera configured to capture and transmit a video signal to the relay service 130 and/or the second communication device 120. As a result, the hearing-impaired user 102 may be able to use visual communication (e.g., sign language) to communicate with others. Such an embodiment may be useful for people whose hearing has been damaged or decreased over time, but who may not be able to verbally communicate well and/or have such damaged hearing that they cannot hear.

The second communication device 120 may comprise a conventional voice telephone (e.g., landline phone, cellular phone, smart phone, VoIP phone, etc.). As such, the hearing-capable user 104 may interact in a conventional manner with the second communication device 120. In some embodiments, the second communication device 120 may be configured similarly as the first communication device (e.g., captioned phone, video phone, etc.). As a result, the second communication device 120 may likewise be operated by a hearing-impaired user. Thus, although facilitating communication between the hearing-impaired user 102 and the hearing-capable user 104 is shown in FIG. 1, such a situation is shown only as an example. Other embodiments include both the first communication device 110 and the second communication device 120 coupled to the relay service 130 to facilitate the interpretive services for each respective hearing-impaired user.

The relay service 130 may be configured to provide interpretive services (e.g., captioning, video) to the hearing-impaired user 102. More specifically, a human "call assistant" within relay service 130 may be employed to facilitate a communication session between a hearing-impaired user 102 and a hearing-capable user 104. As discussed above, in some embodiments the relay service 130 may be configured to provide text captions of at least a portion of the conversation. In such an embodiment, the call assistant may listen to the voice signal received and re-voice the portion of the conversation into a microphone so that voice recognition software may generate the text transcription that is transmitted to the first communication device 110. In some embodiments, the relay service 130 may be configured to provide sign language interpretive services. In such an embodiment, the call assistant may communicate with the hearing-impaired user 102 over a video connection (e.g., via sign language), and then the call assistant may then communicate with the hearing-capable user over a voice connection. Thus, the relay service 130 may include one or more of an internet protocol captioned telephone service (IPCTS), captioned telephone service (CTS), video relay service (VRS), or other telecommunications relay services (TRS).

FIG. 1 shows a configuration where the first communication device 110 acts as a router for the voice signal from the second communication device 120 to the relay service 130. In such an embodiment, the voice signal of the hearing-capable user 104 may be transmitted from the second communication device 120 to the first communication device 110. The voice signal of the hearing-capable user 104 may then be transmitted from the first communication device 110 to the relay service 130 for the text transcription to be generated in a text captioning embodiment. The text transcription may then be transmitted from the relay service 130 to the first communication device 110 to be displayed as a text caption for the hearing-impaired user to read during the conversation. The call assistant may also monitor the text transcription that is generated and transmitted to the first communication device 110 to identify any errors that may have been generated by the voice recognition software. The call assistant may correct such errors, such as described in U.S. Pat. No. 8,379,801, issued Feb. 19, 2013, entitled "Methods and Systems Related to Text Caption Error Correction," the disclosure of which is incorporated herein in its entirety by this reference. In some embodiments the relay service 130 may be configured to receive the voice signal from the second communication device 120 and route the voice signal to the first communication device 110. In some embodiments, another device may receive the voice signal from the second communication device 120 and split the voice signal to route to both the first communication device 110 and the relay service 130.

In addition, although FIG. 1 shows only two communication devices 110, 120, the communication system 100 may include more communication devices. It is contemplated that the communication system 100 may facilitate communication between any number and combinations of hearing-impaired users and hearing-capable users. For example, in some embodiments two or more communication devices may be connected for facilitating communication between a hearing-impaired user and other hearing-impaired users and/or hearing-capable users.

Prior to use of the first communication device 110, the first communication device 110 is installed at an installation location. The installer may be the hearing-impaired user 102 in some embodiments. In some embodiments, a trained technician may install the first communication device 110 for the hearing-impaired user 102. This may be helpful as the trained technician may provide the hearing-impaired user 102 with installation assistance, troubleshooting, training on the use, answering additional questions, etc., which may be particularly helpful for individuals who are not technologically inclined or are unfamiliar with the unique features of the first communication device 110.

Figure 2:
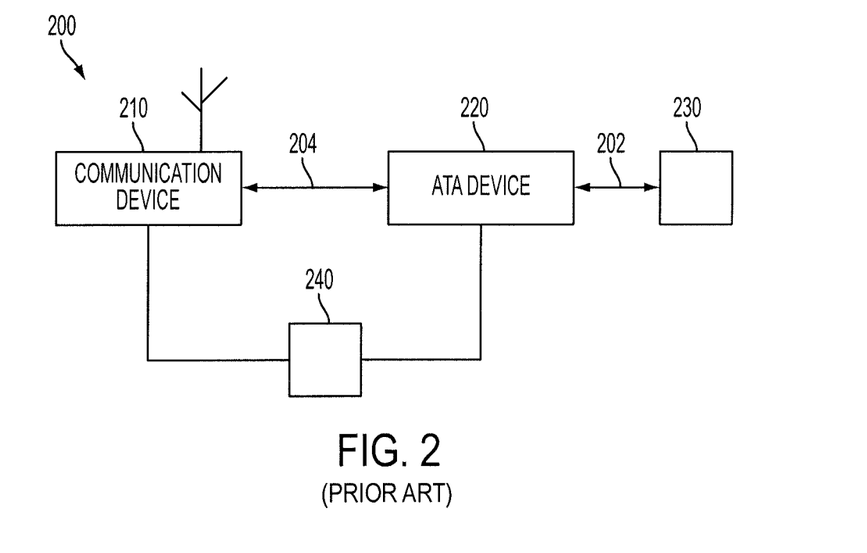
FIG. 2 is a simplified block diagram of a portion of a communication system showing a conventional configuration of a communication device communicating with external networks.

FIG. 2 is a simplified block diagram of a portion of a communication system 200 showing a conventional configuration of a communication device 210 communicating with external networks. This illustration may represent an example of a configuration within installation location for the communication device 210 (e.g., the hearing-impaired user's residence). The communication device 210 may be operably coupled with an analog telephone adaptor (ATA) device 220 for communication therebetween. The ATA device 220 may be operably coupled with a connector 230 (e.g., Ethernet patch connector) for communication therebetween. The communication device 210 and the ATA device 220 may also be coupled with a power source 240 (e.g., via a wall AC power outlet).

The ATA device 220 may communicate (e.g., transmit and receive) digital voice data 202 (e.g., VoIP data) through the connector 230 (e.g., Ethernet patch connector). The digital voice data 202 may include the voice signals passing to and from the second communication device 120 (FIG. 1) during a conversation. The ATA device 220 may be configured to convert the incoming digital voice data 202 into analog voice data 204 that is transmitted to the communication device 210. Similarly, the ATA device 220 may be configured to convert the outgoing analog voice data 204 into digital voice data 202 that is transmitted to the second communication device 120. As a result, the communication device 210 that itself is not configured to communicate over a digital voice network even if the communication device 210 itself does not support digital voice data 202. Thus, the ATA device 220 may assist in this process by providing the conversion of the voice data between the analog and digital domains.

In some embodiments, the communication device 210 may include a wireless port that is configured to communicate data wirelessly with the relay service 130 (FIG. 1). The data communicated with the relay service 130 may include electronic packet switching service (EPSS) data and caption call service (CCS) data. For example, the data may include voice signal data (e.g., of the far end) that the communication device 210 may transmit to the relay service 130. The data may also include the text caption data that the relay service 130 transmits back to the communication device 210 for display.

Because the connection of communication device 210 and the ATA device 220, and the connection of the ATA device 220 and the connector 230 are conventionally wired connections (e.g., Ethernet cables), there may be limitations as to the places that the ATA device 220 and the communication device 210 may be located as they will need to be located relatively close to the connector 230 for the wired connection therebetween. Thus, hearing-impaired users may only be able to locate the communication device 210 at locations that where their physical network cables can reach the connector 230.

Figure 3:
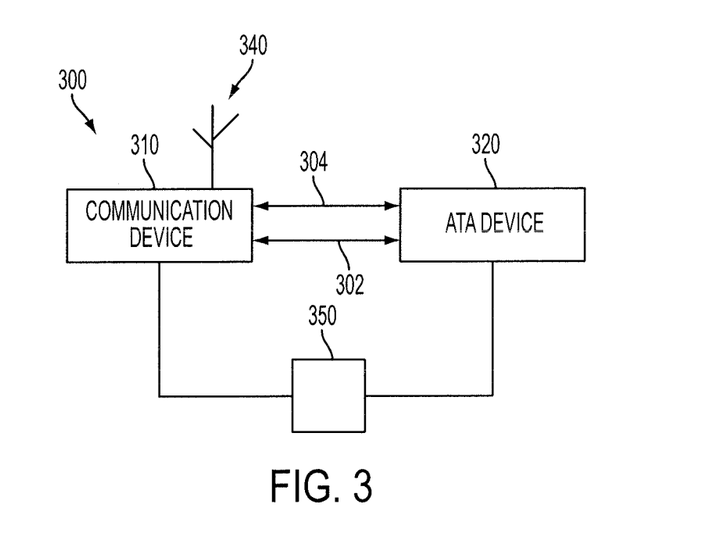
FIG. 3 is a simplified block diagram of a portion of a communication system showing a configuration of a communication device communicating with external networks according to an embodiment of the disclosure.

FIG. 3 is a simplified block diagram of a portion of a communication system 300 showing a configuration of a communication device 310 communicating with external networks according to an embodiment of the disclosure. This illustration may represent an example of a configuration within installation location for the communication device 310 (e.g., the hearing-impaired user's residence). The communication device 310 may be operably coupled with an ATA device 220 for communication therebetween. The communication device 210 and the ATA device 220 may also be coupled with a power source 350 (e.g., via a wall AC power outlet).

The communication device 310 may include a wireless port 340 that is configured to communicate data wirelessly with both the rely service 130 (FIG. 1) and the second communication device 120 (FIG. 1). The data communicated with the relay service 130 may still be facilitated by the communication device 310 and its wireless port 340. Such data communication may include electronic packet switching service (EPSS) data and caption call service (CCS) data. EPSS data may include log-in data, data for property synchronization, contact information, settings, logging information, etc. CCS data may include data used to facilitate transcription of a voice signal. For example, the CCS data may include voice signal data (e.g., of the far end) that the communication device 310 may transmit to the relay service 130. The CCS data may also include the text caption data that the relay service 130 transmits back to the communication device 310 for display. In embodiments that include video data, such video data may be communicated with the relay service 130 through the wireless port 340. In some embodiments, the video data may be communicated separately from voice data. For example, the relay service 130 may split video data and voice data that is sent to the communication device 310. In some embodiments, the communication device 310 may be configured to split video data and voice data that is received together. Video data may be useful for hearing-impaired users who are deaf to facilitate communication with the relay service 130 to provide sign language interpretive services for the conversation.

With respect to communication with the second communication device 120, the communication device 310 may communicate (e.g., transmit and receive) digital voice data (e.g., VoIP data) wirelessly through the wireless port 340. The digital voice data may include the voice signals passing to and from the second communication device 120 during a conversation. Even though this digital voice data is received by the communication device 310, the communication device 310 still may not be able to process the digital voice data to convert to audible sound to produce the hearing-impaired user. Thus, the digital voice data may still need to be converted into an analog voice signal that the communication device 310 can process and support. The communication device 310 may be configured to route the digital voice data 302 (e.g., SIP data) to the ATA device 320. The ATA device 320 may be configured to convert the incoming digital voice data 302 into analog voice data 304 (e.g., POTS data) that is then transmitted back to the communication device 310. Similarly, the ATA device 320 may be configured to convert the outgoing analog voice data 304 into digital voice data 302 that is transmitted back to the communication device 310 to again act as a router for the digital voice data 302 for transmission to the second communication device 120 over the wireless port 340. As a result, the communication device 210 that itself is not configured to communicate over a digital voice network can do so with the assistance of the ATA device 320 providing the conversion of the voice data between the analog and digital domains. However, the ATA device 320 is no longer required to be coupled with a network connector (e.g., Ethernet patch connector) to receive the digital voice data as the digital voice data is received by the communication device 310 acting as a router for such digital voice data. Because the connection of the ATA device 320 and a network connector is no longer required, the options for placement of the communication device 310 and the ATA device 320 may be more flexible. For example, the communication device 310 and the ATA device 320 no longer need to be located close to a network connector for the wired connection therebetween. As a result, the communication device 310 and the ATA device 320 may be located anywhere within the wireless (e.g., Wi-Fi) coverage zone so long as the communication device 310 and the ATA device 320 have access to the power source 350. In addition, the installation of the communication device 310 may be more simple, and the wiring may be reduced. The communication device 310 may also be relocatable without needing to rewire the hearing-impaired user's house.

In some embodiments, one of the ATA device 320 or the communication device 310 may not be coupled directly to the power source 350. For example, the power provided to the ATA device 320 may be provided by the communication device 310. In such an embodiment, the communication device 310 may be configured to provide power to the ATA device 320 through a wired connection (e.g., power over Ethernet (POE), USB, etc.). In some embodiments, the wired connection that provides data may also be used to provide power to the ATA device 320. Similarly, it is contemplated that the ATA device 320 may provide power to the communication device 310. In some embodiments, power may be provided wirelessly (e.g., through mutual inductive coupling). Such embodiments may further improve the flexibility of the placement of the communication device 310 and/or the ATA device 320 if direct access to the power source 350 is limited.

In some embodiments, the communication device 310 may be configured to use routing tables to pass the network packets of the digital voice data to/from the ATA device 320. In some embodiments, the communication device 310 may connect to a dynamic host configuration protocol server (DHCP) server so that the communication device 310 can acquire an IP address dynamically for the ATA device 320. For example, the communication device may be configured to maintain its own address (e.g., MAC address) for the ATA device 320. The communication device 310 may be configured to perform IP masquerading for routing communication between the second communication device 120 and the ATA device 320. As a result, the ATA device 320 may not be aware that it is connected to the communication device 310. In some embodiments, the ATA device 320 may be set with a fixed IP address, which may eliminate the need for a DHCP server. Other protocols (e.g., IPv6, IP-Next, etc.) are also contemplated.

In addition, communication from the communication device 310 to the ATA device 320 may include a multi-cast signal. The multi-cast signal may include a conference call, webinar, etc. The multi-cast signal (e.g., RTP) may be transmitted by the communication device 310 to multiple devices, and the ATA device 320 may be configured to receive and translate the multi-cast signal to the analog voice signal 304.

In addition to converting between digital voice data 302 and analog voice data 304, the ATA device 320 may be configured to perform additional functions, such as call waiting, call blocking, facilitating conference calls with multiple connections, provide additional telephone connections and SIP connections to other devices, etc. In addition, the communication device 310 may be configured to configure the ATA device 320. For example, the communication device 310 may be configured to enable and disable features (e.g., call waiting, call blocking, etc.) of the ATA device 320. In some embodiments, the communication device 310 may also be configured to set the ATA device 320 as a fixed address device and provide the IP address to the ATA device 320. In addition, the communication device 310 may transmit routing information and the domain name server (DNS) to the ATA device 320. In some embodiments, the communication device 310 may also be configured to provide DHCP services for the ATA device 320 and then masquerade the traffic to and from the ATA device 320 as described above.

It should be recognized that the block diagram of FIG. 3 may be in a simplified form and that other components may be present to improve the operation and/or add additional functionality. For example, some embodiments may have a pre-amplifier between the ATA device 320 and the communication device 310, which may be configured to amplify the analog voice data 304. In addition, there may be a voicemail box or other recording device as part of the system, among other contemplated additional features that may be desirable to offer.

For embodiments that include video data, the voice data and video data may be split prior to being received by the communication device 310 through the wireless data port 340. The communication device 310 may route the digital voice data 302 to the ATA device 320 and communicate with the ATA device 320 as discussed above. The video data may lag relative to the voice data, and the communication device 310 may be configured to synchronize the video data and the audio data when presented to the hearing-impaired user. In some embodiments, the communication device 310 may receive video data and digital voice data together through the wireless data port 340, and the communication device 310 may be configured to split the digital voice data prior to transmitting to the ATA device 320.

Figure 4:
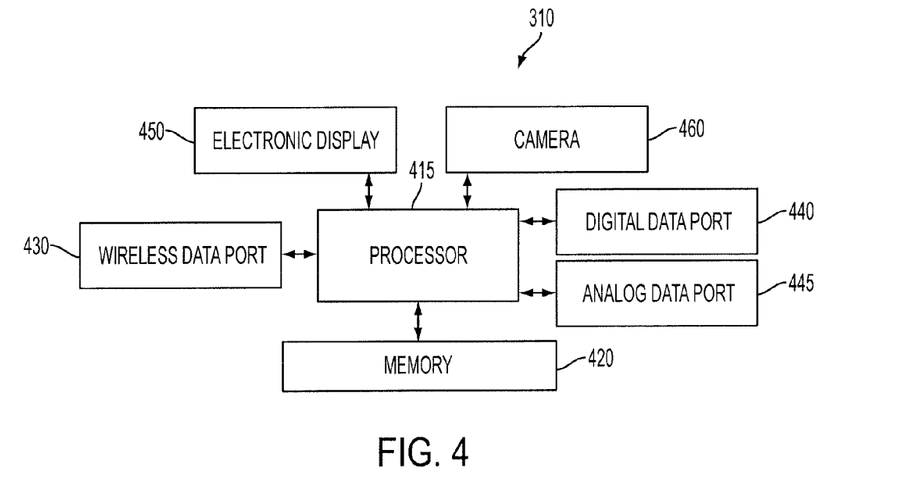
FIG. 4 is a simplified block diagram of the communication device of FIG. 3.

FIG. 4 is a simplified block diagram of the communication device 310 of FIG. 3. The communication device 310 may include a processor 415 operably coupled to a memory 420, a wireless data port 430, a digital data port 440, an analog data port 445, an electronic display 450, and a camera 460. Other I/O devices may be included (e.g., a speaker, microphone, touch screen, keypad, etc.) to facilitate other communications of the communication device 210. The memory 420 may include a computer-readable medium, comprising any of a random access memory (RAM), a read-only memory (ROM), a Flash memory, other suitable memory devices, and combinations thereof. The memory 420 may include instructions that may be executed by the processor 415 to implement the operations described herein. For example, the routing tables and other instructions for routing the digital voice data to/from the ATA device 320 (FIG. 3) may be stored therein. The electronic display 450 may be configured to display the text captions as discussed above for embodiments that include a captioned communication device. The electronic display 450 may be configured to display video as discussed above for embodiments that include a video communication device. The camera 460 may be configured to capture video for embodiments that include video communication devices.

The communication device 310 may be configured to communicate with another communication device and/or relay service as discussed above. For example, the communication device 310 may be configured to communicate with the ATA device 320 (FIG. 3) through the digital data port 440 and the analog data port 445. The communication device 310 may also be configured to communicate with the relay service 130 (FIG. 1) and the second communication device 120 (FIG. 1) through the wireless data port 430. The digital voice data communication between the communication device 310 and the second communication device 120 may be routed to the ATA device 320 as described above.

Figure 5:
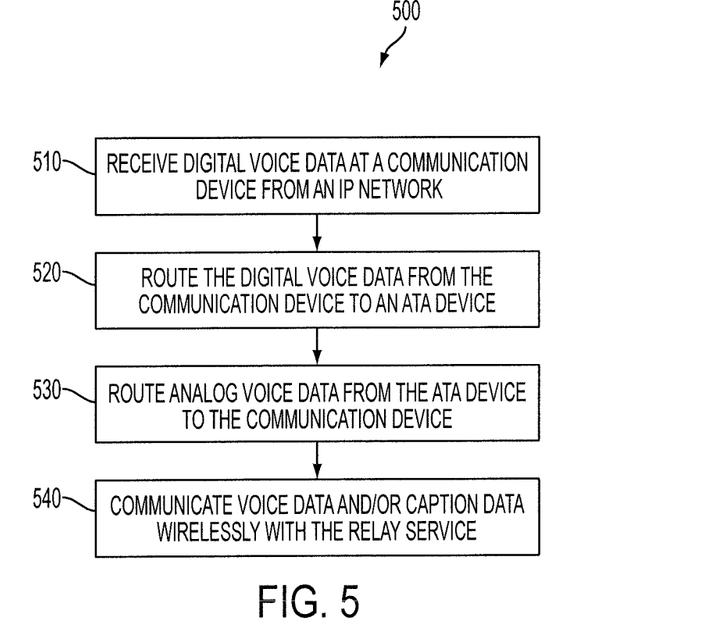
FIG. 5 is a simplified flowchart illustrating a method of facilitating communication in a communication network including a communication device and a relay service according to an embodiment of the disclosure.

FIG. 5 is a simplified flowchart illustrating a method of facilitating communication in a communication network including a communication device and a relay service according to an embodiment of the disclosure.

At operation 510, the communication device may receive digital voice data from an IP network. The digital voice data may be received by a wireless data port of the communication device, which may also be coupled with the relay service configured to provide interpretive assistance (e.g., text captions) for assisting hearing-impaired users communicate. At operation 520, the communication device may route the digital voice data to an ATA device. The ATA device may be configured to convert the digital voice data to analog voice data. At operation 530, the communication device may receive the analog voice data from the ATA device. Similarly, the communication device may transmit analog voice data to the ATA and receive digital voice data in return. At operation 540, the voice data and/or caption data may be communicated with the relay service through the wireless port of the communication device.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A communication system facilitating communication for assisting hearing-impaired users comprising:
    an analog telephone adaptor (ATA) device configured to perform additional functions selected from the group consisting of call waiting, call blocking, facilitating conference calls with multiple connections, providing additional telephone connections, and providing SIP connections to other devices; and
    a communication device operably coupled with the ATA device, the communication device configured to:
        enable and disable at least one of the additional functions of the ATA;
        receive digital far-end voice data from a far-end communication device via a wireless port of the communication device;
        route the far-end digital voice data to the ATA device and receive converted analog far-end voice signals in return from the ATA device;
        transmit near-end analog voice signals to the ATA and receive converted digital near-end voice data in return from the ATA device;
        route the converted digital near-end voice data to the far-end communication device; and
        route the digital far-end voice data via the wireless port to a communication service configured to provide interpretive assistance for a hearing-impaired user of the communication device.

2. The communication system of claim 1, wherein the communication device is configured to configure the ATA device to operate a fixed IP address.

3. The communication system of claim 1, wherein the communication device is configured to extend DHCP services to the ATA and masquerade the traffic to the ATA device.

4. The communication system of claim 1, wherein the ATA device and the communication device are coupled together via a wired connection.

5. The communication system of claim 1, wherein the ATA device is not coupled with any external network other than through the communication device.

6. A communication system comprising:
    a communication service configured to provide captioning services for hearing-impaired users during a communication session;
    a communication device operably coupled with the communication service, the communication device configured to:
        enable and disable at least one additional function of an analog telephone adaptor (ATA); and
    analog telephone adaptor (ATA) device operably coupled with the communication device, the ATA device configured to:
        convert far-end digital voice data received from the communication device to converted far-end analog voice signals;
        transmit the converted far-end analog voice signals to the communication device;
        convert near-end analog voice signals received from the communication device to converted near-end digital voice data;
        transmit the converted near-end digital voice data to the communication device, wherein the communication device is further configured to route the converted near-end digital voice data and the far-end digital voice data between the ATA device and a far-end communication device; and
        perform additional functions selected from the group consisting of call waiting, call blocking, facilitating conference calls with multiple connections, providing additional telephone connections, and providing SIP connections to other devices.

7. The communication system of claim 6, wherein the far-end digital voice data and the converted near-end digital voice data include VoIP data.

8. The communication system of claim 6, wherein the communication device is configured to route the converted near-end digital voice data and the far-end digital voice data between the ATA device the second communication device through a wireless port of the communication device.

9. A method of facilitating communication in a communication network including a communication device and a communication service, the method comprising:
    receiving far-end digital voice data wirelessly from a second communication device;
    routing the far-end digital voice data to an analog telephone adaptor (ATA) device for conversion to an analog voice signal to be processed by the communication device;
    enabling or disabling at least one of the ATA functions selected from the group consisting of call waiting, call blocking, facilitating conference calls with multiple connections, providing additional telephone connections, and providing SIP connections to other devices;
    transmitting a near-end analog voice signal to the ATA device for conversion to digital voice data;
    routing the converted near-end digital voice data received from the ATA device wirelessly to the second communication device; and
    communicating wirelessly with a communication service configured to provide captioning services of the content of at least a portion of the voice data received by the communication device from the second communication device.

10. The method of claim 9, wherein routing includes the communication device using at least one of the following methods: routing tables, IP masquerading, dynamic IP addresses, fixed IP addresses, and multi-cast transmission.

11. The communication system of claim 4, wherein the wired connection is configured to provide power from the communication device to the ATA device or from the ATA device to the communication device.

12. The communication system of claim 1, wherein the communication device is configured to maintain its own address for the ATA device.

13. The communication system of claim 1, wherein the communication device comprises an electronic display operably coupled with a processor, the processor configured to cause text data to be displayed as captions on the electronic display during the conversation.

14. The communication system of claim 6, wherein the communication device is configured to route the digital voice data to the ATA device by using routing tables to pass the digital voice data to and from the ATA device.

15. The communication system of claim 6, wherein the communication device is configured to route the digital voice data to the ATA device by using IP masquerading.

16. The communication system of claim 6, wherein the communication device is configured to use a fixed IP address for the ATA device to route the digital voice data to and from the ATA device.

17. The communication system of claim 6, wherein the communication device is configured to use extend dynamic host configuration protocol server (DHCP) services to the ATA device to route the digital voice data to and from the ATA device.

* * * * *

UNITED STATES PATENT AND TRADEMARK OFFICE
CERTIFICATE OF CORRECTION

PATENT NO. : 9,247,052 B1  Page 1 of 1
APPLICATION NO. : 14/709303
DATED : January 26, 2016
INVENTOR(S) : Sean Walton It is certified that error appears in the above-identified patent and that said Letters Patent is hereby corrected as shown below:

In the specification:
COLUMN 2, LINE 58, change "description reference" to --description, reference--
COLUMN 7, LINE 49, change "rely service 130" to --relay service 130--
COLUMN 9, LINE 11, change "device may" to --device 310 may--

In the claims:
CLAIM 6, COLUMN 11, LINE 55, change "analog telephone" to --an analog telephone--
CLAIM 8, COLUMN 12, LINE 16, change "the second communication" to --and a second communication--

Signed and Sealed this
Thirty-first Day of May, 2016

Michelle K. Lee
*Director of the United States Patent and Trademark Office*